United States Patent
Roberts et al.

[11] Patent Number: 5,529,320
[45] Date of Patent: Jun. 25, 1996

[54] QUICK CHANGE TOP JAW

[75] Inventors: Randall E. Roberts, Twinsburg; Garry Paulin, Willoughby Hills, both of Ohio

[73] Assignee: Illinois Tool Works, Inc., Glenview, Ill.

[21] Appl. No.: 406,840

[22] Filed: Mar. 20, 1995

[51] Int. Cl.$^6$ ...................................................... B23B 31/16
[52] U.S. Cl. .............................................. 279/124; 279/152
[58] Field of Search ....................................... 279/123, 124, 279/152–154

[56] References Cited

U.S. PATENT DOCUMENTS

| | | | |
|---|---|---|---|
| 302,649 | 7/1884 | Carleton | 279/123 |
| 460,601 | 10/1891 | Skinner | 279/123 |
| 1,844,616 | 2/1932 | Whiton | 279/123 |
| 3,190,666 | 6/1965 | Testa | 279/123 |
| 3,868,120 | 2/1975 | Blattry et al. | 279/123 |
| 4,496,165 | 1/1985 | Schrekeis et al. | 279/123 |
| 4,546,988 | 10/1985 | Gailey | 279/123 |
| 4,696,482 | 9/1987 | Brown | 279/154 |
| 4,772,034 | 9/1988 | Brown | 279/154 |
| 4,861,048 | 8/1989 | Slata | 279/123 |
| 4,928,981 | 5/1990 | Brown | 279/154 |
| 4,982,970 | 1/1991 | Otani et al. | 279/123 |
| 5,076,596 | 12/1991 | Jaggers | 279/123 |
| 5,163,693 | 11/1992 | Jaggers | 279/124 |
| 5,190,300 | 3/1993 | Jaggers | 279/124 |
| 5,199,725 | 4/1993 | Jaggers | 279/123 |

*Primary Examiner*—Steven C. Bishop
*Attorney, Agent, or Firm*—Watts, Hoffmann, Fisher & Heinke Co.

[57] ABSTRACT

A top jaw for attachment to a master jaw slidable radially in a front face of a rotary chuck toward and away from a central rotational axis of the chuck, the top jaw being suitable for alternate gripping of the inside and outside periphery of a tubular workpiece. When positioned for gripping the outside periphery of a workpiece the top jaw includes a base having a radial locating face and a second locating face directed centrally of a chuck and an insert having a radial locating surface and a transverse locating surface facing away from the chuck axis and cooperating with said base second locating face. One of the base and insert have a slot with side locating faces perpendicular to the radial locating face and the other of the base and insert have a projection with locating surfaces perpendicular to the radial locating face, each opposing an associated one of the side locating faces. A fastener connects the insert to the base.

13 Claims, 3 Drawing Sheets

5,529,320

QUICK CHANGE TOP JAW

BACKGROUND OF THE INVENTION

1. Field of the Invention

This invention relates to a top jaw construction for a rotary chuck and more particularly to a construction of a base and insert of the top jaw that facilitates machining workpieces of different inner and outer diameters.

2. Prior Art

Rotary chucks of a typical construction have radially movable master jaws in a front face that carry removable work-gripping jaws. One form of work gripping jaw utilizes a base and an insert. The insert is attached to the base and directly grips the workpiece. Inserts of different sizes or having different work gripping faces are usable with a single base and accommodate gripping different sized workpieces or differently contoured workpiece surfaces.

SUMMARY OF THE INVENTION

The present invention is a top jaw for a chuck in which an insert that directly engages a workpiece is constructed to be removably received and accurately positioned against locating surfaces on a base. The top jaw is attached to a master jaw slidable radially in a front face of a rotary chuck toward and away from a central rotational axis of the chuck. Inserts of different sizes or having different work gripping faces are usable with a single base and accommodate gripping different sized workpieces or differently contoured workpiece surfaces. The inserts and the base have a construction permitting the inserts to be quickly and easily changed. The present top jaw is suitable for alternate gripping of the inside and outside diameter of a tubular workpiece.

When positioned for gripping the outside diameter of a workpiece, the present top jaw includes a base having a radial locating face and a second locating face directed centrally of the chuck. The insert has a radial locating surface and a transverse locating surface facing away from the chuck axis and cooperating with the base second locating face. One of the base and insert has a slot with side locating faces perpendicular to the radial locating face and the other of the base and insert has a projection with locating surfaces perpendicular to the radial locating face, each opposing an associated one of the side locating faces. The projection is positioned in the slot to facilitate locating and releasably connecting the insert to the base. A fastener connects the insert to the base.

In a preferred embodiment the slot side locating faces are part of the base and the projection locating surfaces are part of the insert. The fastener, which is a spring loaded lock pin, is carried by the base and engages the projection. The base further comprises first and second sides each with a locating face perpendicular to the radial locating face, and the insert further comprises first and second sides opposed to the base first and second sides each with a side locating surface spaced to straddle the base and extending perpendicular to the radial locating surface. The base radial locating face is opposed to and cooperates with the insert radial locating surface. The base second locating face and the transverse locating surface are sloped to cam the insert radial locating surface into position against the base radial locating surface.

The insert includes a workpiece engaging surface facing toward or away from the chuck axis for engaging a workpiece, first and second side surfaces perpendicular to the workpiece engaging surface and terminating short of the workpiece engaging surface, and first and second connecting surfaces each connecting an associated one of the first and second side surfaces and the workpiece engaging surface. The workpiece engaging surface includes a serrated portion that engages the workpiece.

In a preferred embodiment, the base has holes extending in a direction of the base radial face each for receiving a screw for securing the insert to the base, whereby the insert can be held in a work gripping position for machining a workpiece engaging surface to conform to a configuration of the workpiece.

The above features and others will become more apparent from the detailed description that follows.

DETAILED DESCRIPTION OF THE PREFERRED EMBODIMENTS

Figure 2:
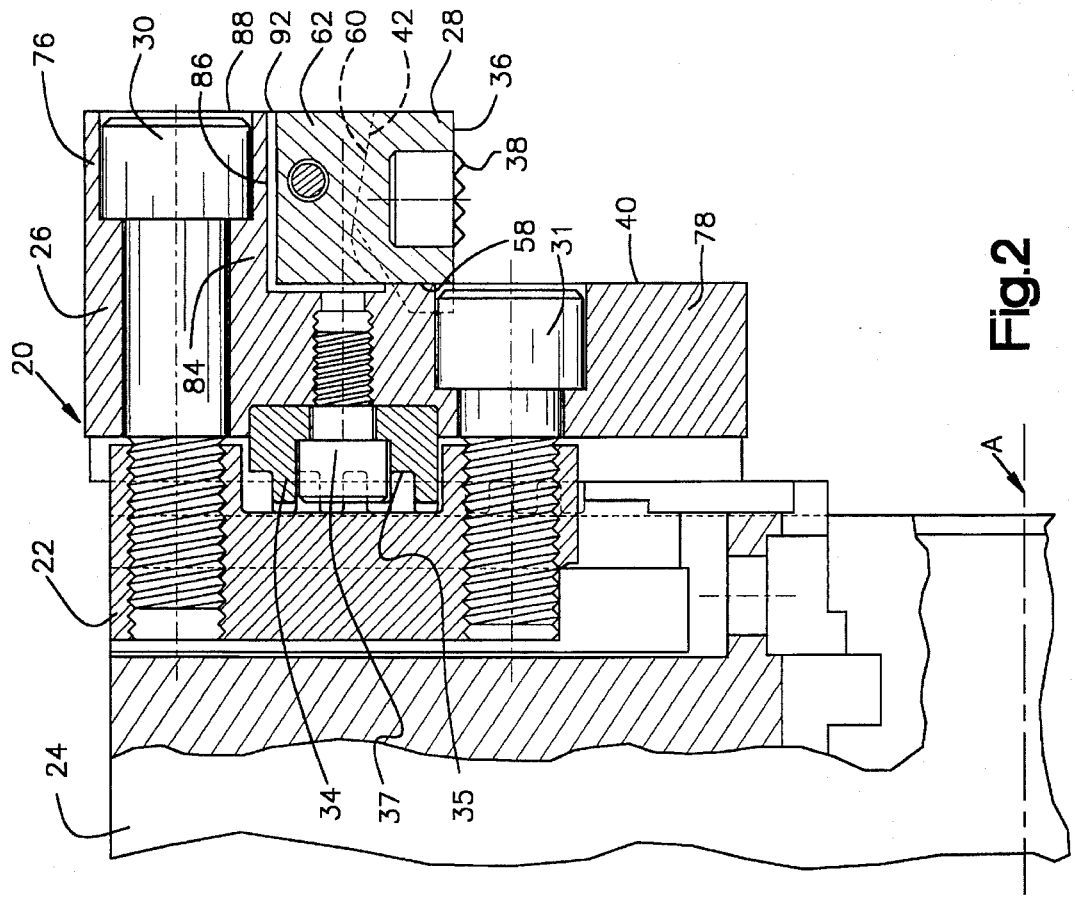
FIG. 2 is a sectional view as seen from the lines 2—2 of FIG. 1.
Figure 1:
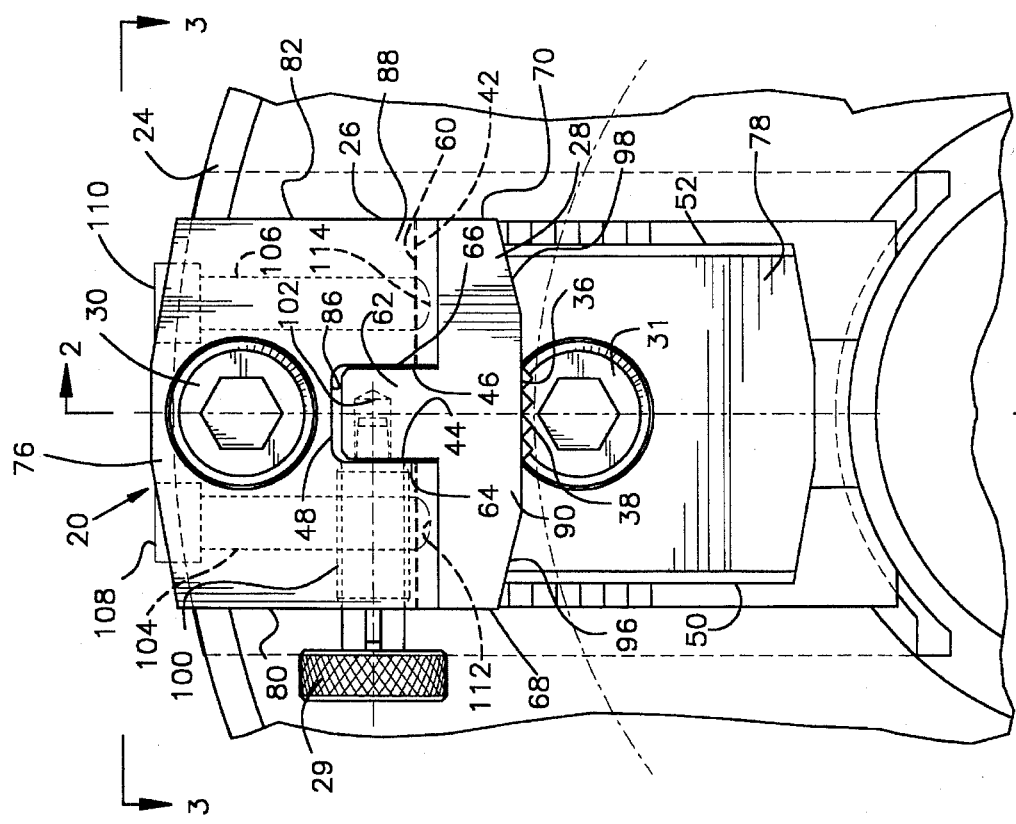
FIG. 1 is a front elevational view of a top jaw of a rotary chuck constructed in accordance with the invention, with the top jaw being positioned for gripping the outside periphery of a workpiece.

Turning now to the drawings, and to FIGS. 1 and 2 in particular, a top jaw 20 embodying the present invention is secured to a master jaw 22 or slide of a rotary chuck 24. Although only a portion of the chuck and one master jaw are shown, there are typically three such jaws each spaced 120° from the next. The chuck 24 is rotatable about a central axis A and the master and top jaws are movable radially toward and away from the axis A to grip a workpiece, which is to be rotated by the chuck for a machining operation, and then to release the workpiece for replacement.

The top jaw 20 is comprised of a base 26 and a removable insert 28. The base 26 is secured to the master jaw 22 by two socket-headed cap screws 30, 31 and is located with a key 34 adjustable on the master jaw 22 and located with transverse grooves 35, to permit adjusting the radial position of the top jaw for different ranges of workpieces to be gripped. The key 34 is connected to the base 26 by a fastener 37. It should be appreciated by those skilled in the art that the key 34 with grooves 35 is just one of many industry standard mountings that may be used. The insert 28 is removably carried by the base 26 by a fastener such as a spring loaded lock pin 29. The insert 28 directly grips a workpiece with an axially facing surface 36, which in one embodiment is shown having serrations 38, but could alternatively be smooth.

FIGS. 1 and 2 show the top jaw 20 when it is positioned for gripping the outside periphery of a workpiece. The base 26 has six surfaces for locating the insert 28 relative to the base 26. The base 26 has a radial locating face 40. A second locating face 42 is directed centrally of the chuck. A slot 48 formed in the base 26 has side locating faces 44, 46, perpendicular to the radial locating face 40. First and second sides 50, 52 each have a locating face 54, 56 perpendicular to the radial locating face 40.

The insert 28 has six surfaces for coacting with the base locating surfaces. The insert 28 has a radial locating surface 58. A transverse locating surface 60 faces away from the chuck axis A (FIG. 2) and cooperates with the base second locating face 42. A central projection 62 on the insert 28 has locating surfaces 64, 66 perpendicular to the radial locating face 40, each opposing an associated one of the side locating faces 44, 46. The insert 28 also includes first and second sides 68, 70 opposed to the base first and second sides 50, 52, each with a side locating surface 72, 74 spaced to straddle the base 26 and extending perpendicular to the insert radial locating surface 58.

As best shown in FIG. 2, the base 26 has a first portion 76 and a second portion 78. The first portion 76 has two sides 80, 82. The second portion 78 terminates in a direction of the axis A before the first portion 76 to form a shelf portion 84. The shelf portion 84 is formed by the slot 48 and the base second locating face 42. The shelf portion 84 extends axially a greater distance than the second portion 78. The slot 48 is defined at its back by the radial locating face 40, by the side locating faces 44, 46, and by a slot upper surface 86. The base second locating face 42 faces the axis A (FIG. 2) and is radially sloped from an inner face 88 of the first portion 76 of the base 26 to the base radial locating face 40, away from the axis A.

Figure 6:
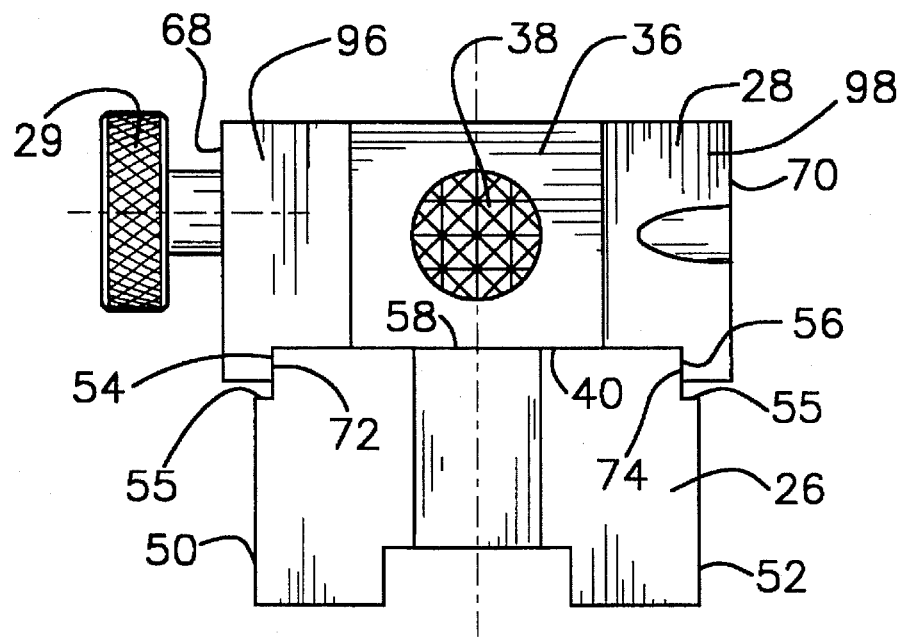
FIG. 6 is a bottom plan view as seen from the lines 6—6 of FIG. 4.

The first and second sides 50, 52 are part of the base second portion 78. The base second portion 78 preferably has a smaller width than the base first portion 76 (FIG. 1). The first and second sides 50, 52 each include a stepped portion 55 having the side locating faces 54, 56 (FIG. 6).

The insert 28 has an inverted T configuration as shown in FIG. 1, and the projection 62, which extends at a right angle from the insert body portion 90, is positioned in the slot 48 to retain the insert 28 relative to the base 26. The insert 29 preferably includes the projection 62, which extends from an insert body portion 90. Alternatively, the base 26 could include the projection 62 and the insert 28 could include the slot 48. The projection 62 is positioned in the slot 48 to prevent movement of the insert 28 relative to the base 26 in a direction perpendicular to the chuck axis A along the base radial locating face 40. As shown in FIG. 2, there is a clearance 92 between the projection 62 and the slot upper surface 86 and rear surface 87, which assures that the securing mechanism does not interfere with the positioning of the insert by the locating surfaces 40, 58; 42, 60; 54, 72 and 56, 74.

The transverse locating surface 60 of the insert body portion 90 is sloped to correspond to the slope of the base second locating face 42. This slope serves to cam the insert radial locating surface 58 into position against the base radial locating face 40.

The workpiece engaging surface 36 axially faces toward the chuck axis A (FIGS. 1 and 2). The insert first and second sides 68, 70 are perpendicular to the workpiece engaging surface 36 and, with respect to a radial direction toward the axis A, terminate radially short of the workpiece engaging surface 36. As best shown in FIG. 1, the insert body 90 has first and second connecting surfaces 96, 98, which each connect an associated one of the first and second sides 68, 70 and the workpiece engaging surface 36. This permits reversibly gripping an inside periphery as well as an outside periphery of a workpiece. The insert 28 may grippingly engage the inside periphery of a workpiece because the workpiece engaging surface 36 has a small enough width to fit against any curvature of workpieces that can suitably be machined in the chuck 24. In addition, the insert 28 still has an overall width between sides 68, 70 that is greater than the width of the workpiece engaging surface 36. This provides a large locating surface 60, and increases the strength of the insert 28.

The spring loaded lock pin 29 is carried by the base 26 and is normally not removed therefrom. This allows convenient replacement of the inserts 28 without risk of losing the lock pin 29. The lock pin 29 is disposed in a hole 100 formed in the base 26, and engages a recess 102 formed in each insert projection 62.

Figure 5:
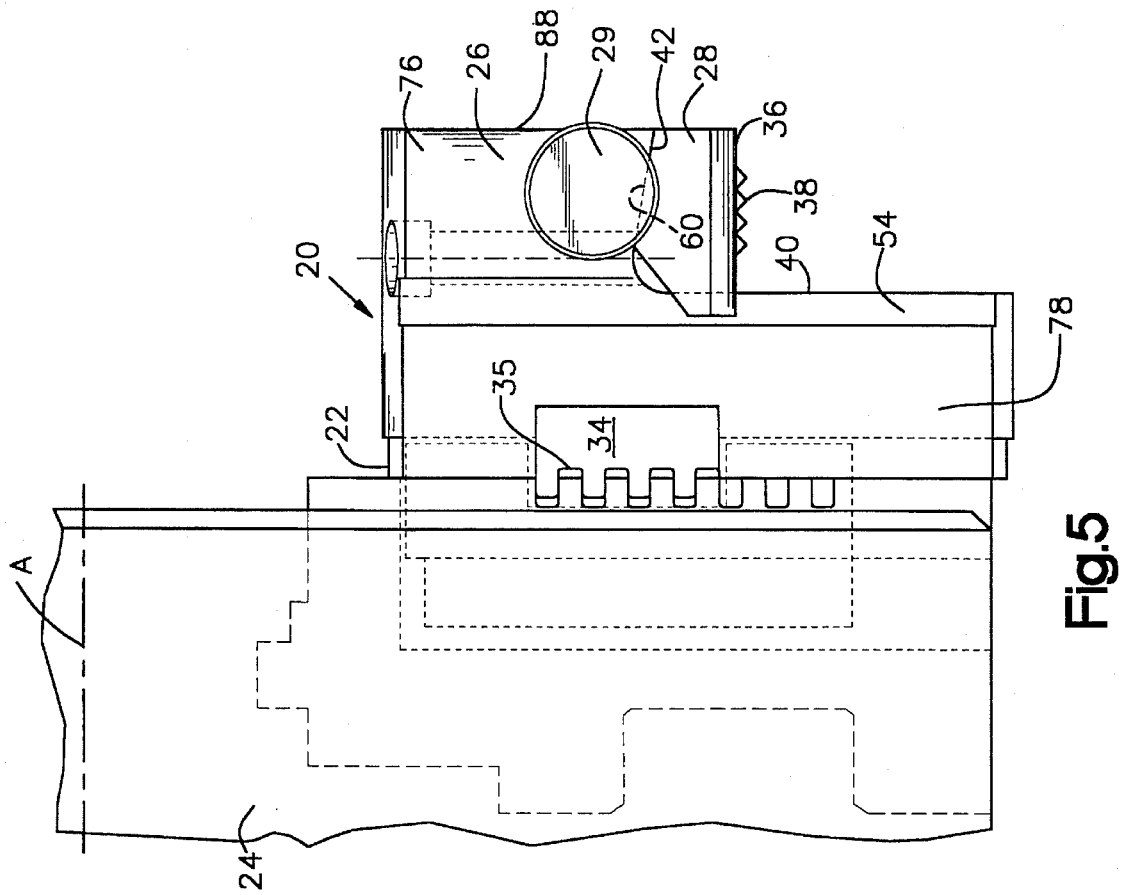
FIG. 5 is a left side elevational view as seen from the lines 5—5 of FIG. 4.
Figure 4:
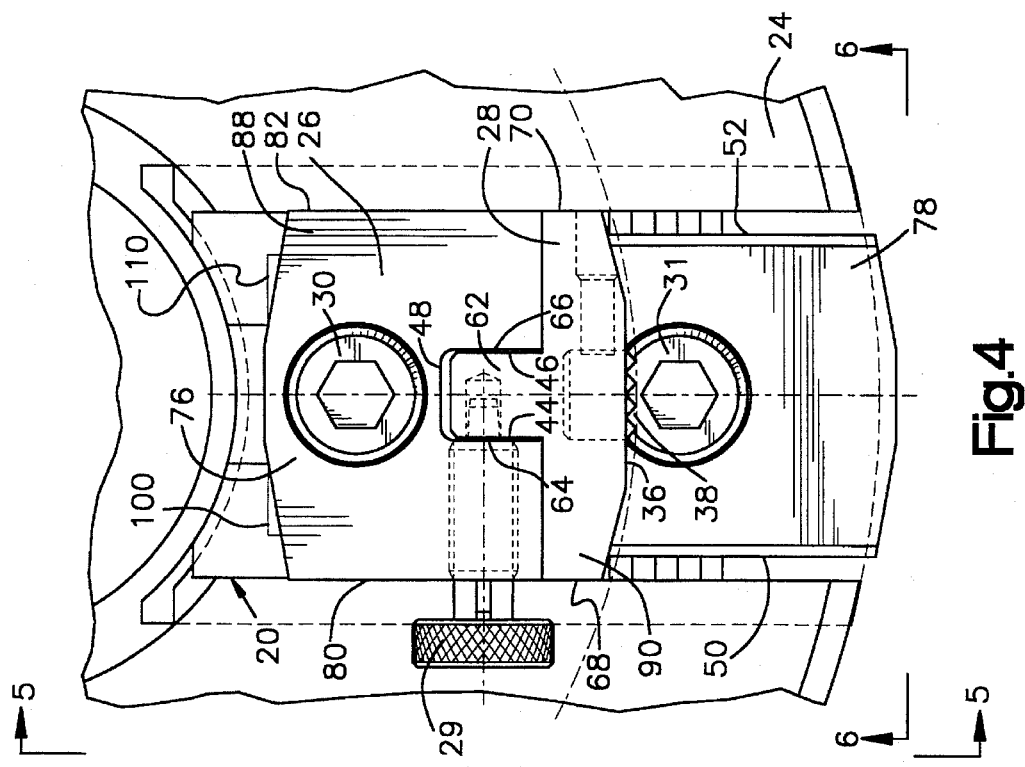
FIG. 4 is a front elevational view of a top jaw of a rotary chuck constructed in accordance with the invention, with the top jaw being positioned for gripping the inside periphery of a workpiece.

Although the top jaw 20 is shown positioned to engage the outside periphery of a workpiece in FIGS. 1 and 2, the top jaw 20 is also adapted to be reversibly positioned to engage the inside periphery of a workpiece as shown in FIGS. 4 and 5. All that is required to reverse the top jaw 20 for gripping the workpiece inside periphery is to unfasten the socket headed cap screws 30, 31, remove the base 26 from the master jaw 22, position the base on the chuck at a predetermined location for inside diameter gripping as shown in FIG. 4, and fasten the base in that position with the socket headed cap screws 30, 31. Because the workpiece gripping surface 36 is configured to have a small width, the top jaw 20 is now positioned for gripping any inside diameter curvature of workpieces machinable in the chuck.

By way of example, in one preferred embodiment, for a standard 10 inch chuck with 0.25 inch jaw travel, the outside periphery grip range varies from 1.500 inches to 6.063 inches and the inside periphery grip range varies from 7.172 inches to 12.125 inches. This is provided by a quantity of inserts, e.g., seventeen, that vary in length from the locating surface 60 to the work gripping surface 36 or 38 in small increments coordinated with the limited jaw travel. It should be appreciated by those skilled in the art that depending upon the jaw travel and chuck used, the grip ranges and number of inserts used may vary.

To assemble an insert 28 to a base 26 connected to the master jaw 22 for suitable workpiece gripping, the insert 28 is positioned against the base 26 by withdrawing the pin from the slot 48 and inserting the projection 62 into the slot 48. The insert transverse locating surface 60 is cammed against the base second locating face 42 so that the insert radial locating surface 58 abuts against the base radial locating face 40. The insert first and second sides 68, 70 extend beyond the base first and second sides 50, 52, respectively. The insert side locating surfaces 72, 74 (FIG. 6) are spaced to straddle the base 26 and face an associated one of the base side locating faces 54, 56. The pin 29 is then released and due to the bias of its spring, advances in the hole 100 to the recess 102 to engage the projection 62. When it is desired to replace the insert 28 with one having a different grip range, the reverse procedure is performed to remove the existing insert 28. Another insert 28 is then assembled to the base in the manner described.

Figure 3:
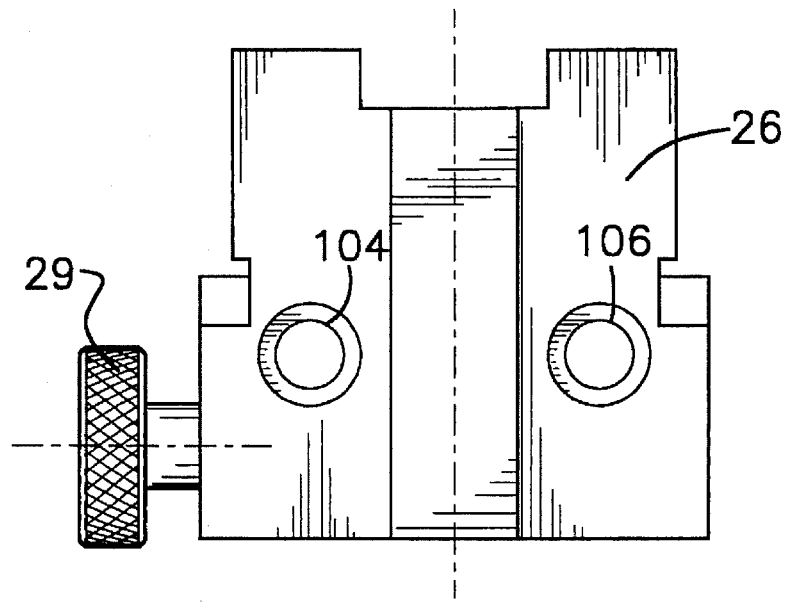
FIG. 3 is a top plan view as seen from the lines 3—3 of FIG. 1, showing two holes used for blank machining of the inserts.

In another embodiment of the invention shown in FIGS. 1 and 3, the top jaw 20 is constructed to be used in a blank jaw machining procedure for machining a workpiece engaging surface of an insert to conform to a curvature of the workpiece. The base 26 is predrilled and tapped with two holes 104 and 106 therein parallel to a direction of the base first and second sides 80, 82 along the base radial locating face 40, each for receiving a fastener such as a socket headed cap screw 108, 110 for securing the insert to the base 26. A blank insert is used having the configuration described above, except without a previously machined workpiece engaging surface of an insert 36. The blank insert has holes 112, 114 predrilled and tapped therein that match and are aligned with the base holes 104, 106.

The procedure for machining a blank insert requires holding the insert against the base 26 in the proper workpiece gripping position described above. The insert is then held by socket headed cap screws 108, 110, positioned in the holes 104, 106 and screwed into the holes 112, 114 of the insert 28. When the master jaw 22 is at approximately mid travel on the chuck 24, the blank insert is machined to form a workpiece engaging surface on the blank insert having a contour corresponding to that of a workpiece to be engaged. The screws 108, 110 are removed after the insert has been machined, and the insert is held in place by the pin 29 in the manner described above.

While preferred embodiments of the invention have been described in detail, various modifications may be made thereto without departing from the spirit and scope of the invention as set forth in the appended claims.

In the claims:

1. A top jaw for attachment to a master jaw slidable radially in a front face of a rotary chuck toward and away from a central rotational axis of the chuck, the top jaw being suitable for alternative gripping of the inside and outside periphery of a tubular workpiece, and when positioned for gripping the outside periphery of a workpiece the top jaw comprising a base having a radial locating face and a second locating face, the base second locating face being directed toward the chuck axis, an insert having a radial locating surface and a transverse locating surface, the insert transverse locating surface facing away from the chuck axis and cooperating with said base second locating face, one of the base and insert having a slot with side locating faces perpendicular to the radial locating face and the other of the base and insert having a projection with locating surfaces perpendicular to the radial locating face, each of the projection locating surfaces opposing an associated one of the slot side locating faces, said projection being positioned in the slot to prevent movement of the insert relative to the base in a direction along the base radial locating face, and a fastener connecting the insert to the base, said fastener being the only mechanical connection between the insert and the base and comprising a single spring loaded lock pin.

2. A top jaw as set forth in claim 1 wherein the slot side locating faces define a single slot in the base and the projection locating surfaces define a single projection on the insert.

3. A top jaw as set forth in claim 1 wherein the lock pin is carried by the base and engages said projection.

4. A top jaw as set forth in claim 1 wherein the base further comprises first and second sides each with a locating face substantially perpendicular to the base radial locating face, and the insert further comprises first and second sides opposed to the base first and second sides spaced to straddle the base, the insert first and second sides each having a side locating surface that opposes an associated one of the base first and second side locating faces and extends substantially perpendicular to the insert radial locating surface.

5. A top jaw as set forth in claim 4 wherein the base radial locating face is opposed to and cooperates with the insert radial locating surface.

6. A top jaw as set forth in claim 5 wherein the base second locating face and the insert transverse locating surface are sloped to cam the insert radial locating surface into position against the base radial locating face.

7. A top jaw as set forth in claim 1 wherein the insert includes a workpiece engaging surface facing toward the chuck axis for engaging a workpiece, first and second side surfaces perpendicular to said workpiece engaging surface and terminating before said workpiece engaging surface, and first and second connecting surfaces each connecting an associated one of said first and second side surfaces and said workpiece engaging surface.

8. A top jaw as set forth in claim 7 wherein the base has holes extending in a direction of the base radial face each for receiving a screw for securing the insert to the base, whereby the insert can be held in a workpiece gripping position for machining a workpiece engaging surface to conform to a configuration of the workpiece.

9. A top jaw as set forth in claim 7 wherein said workpiece engaging surface includes a serrated portion that engages the workpiece.

10. A top jaw as set forth in claim 3 wherein the lock pin is received by an elongated cylindrical bore in the insert.

11. A top jaw for attachment to a master jaw slidable radially in a front face of a rotary chuck toward and away from a central rotational axis of the chuck, the top jaw being suitable for alternative gripping of the inside and outside periphery of a tubular workpiece, and when positioned for gripping the outside periphery of a workpiece the top jaw comprising a base having a radial locating face and a second locating face, the second locating face being directed toward the chuck axis, the base having a single slot with side locating faces perpendicular to the radial locating face, the base further comprising first and second sides each with a locating face substantially perpendicular to the radial locating face, an insert having a radial locating surface and a transverse locating surface, the insert radial locating surface being opposed to and cooperating with the base radial locating face, the insert transverse locating surface facing away from the chuck axis and cooperating with said base second locating face, the insert having a single projection with locating surfaces perpendicular to the base radial locating face, each of the projection locating surfaces opposing an associated one of the slot locating faces, said projection being positioned in the slot to prevent movement of the insert relative to the base in a direction along the base radial locating face, each of the insert first and second side locating surfaces being spaced to straddle the base and extending substantially perpendicular to the insert radial locating surface, said base second locating face and the insert transverse locating surface being sloped to cam the insert radial locating surface into position against the base radial locating face when clamping force is exerted upon a workpiece, and a fastener connecting the insert to the base.

12. A top jaw as set forth in claim 11 wherein said fastener is the only mechanical connection between the insert and the base and comprises a single spring loaded lock pin.

13. A top jaw as set forth in claim 12 wherein the lock pin is received by a cylindrical bore in said projection.

* * * * *